Jan. 27, 1959   R. G. HIBBARD   2,871,028
IMPLEMENT HITCH
Filed Nov. 16, 1953   4 Sheets-Sheet 2
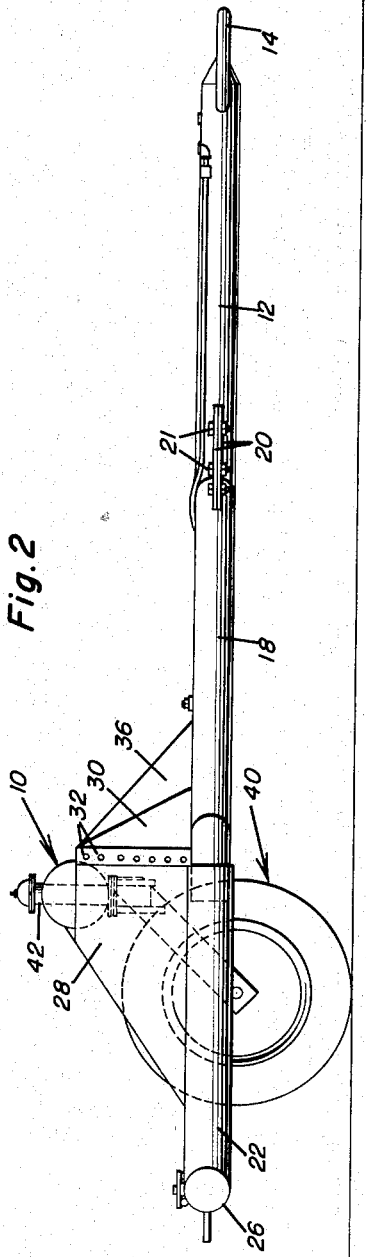
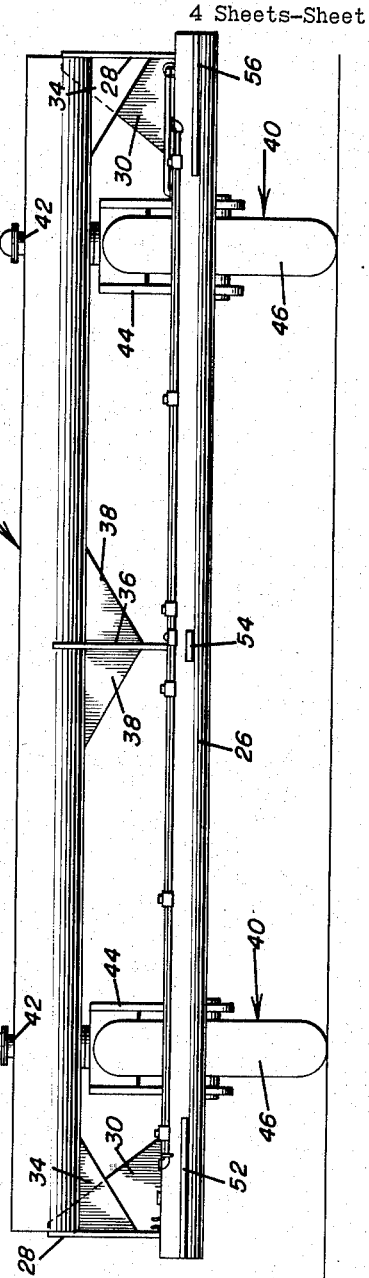
Rowland G. Hibbard
INVENTOR.

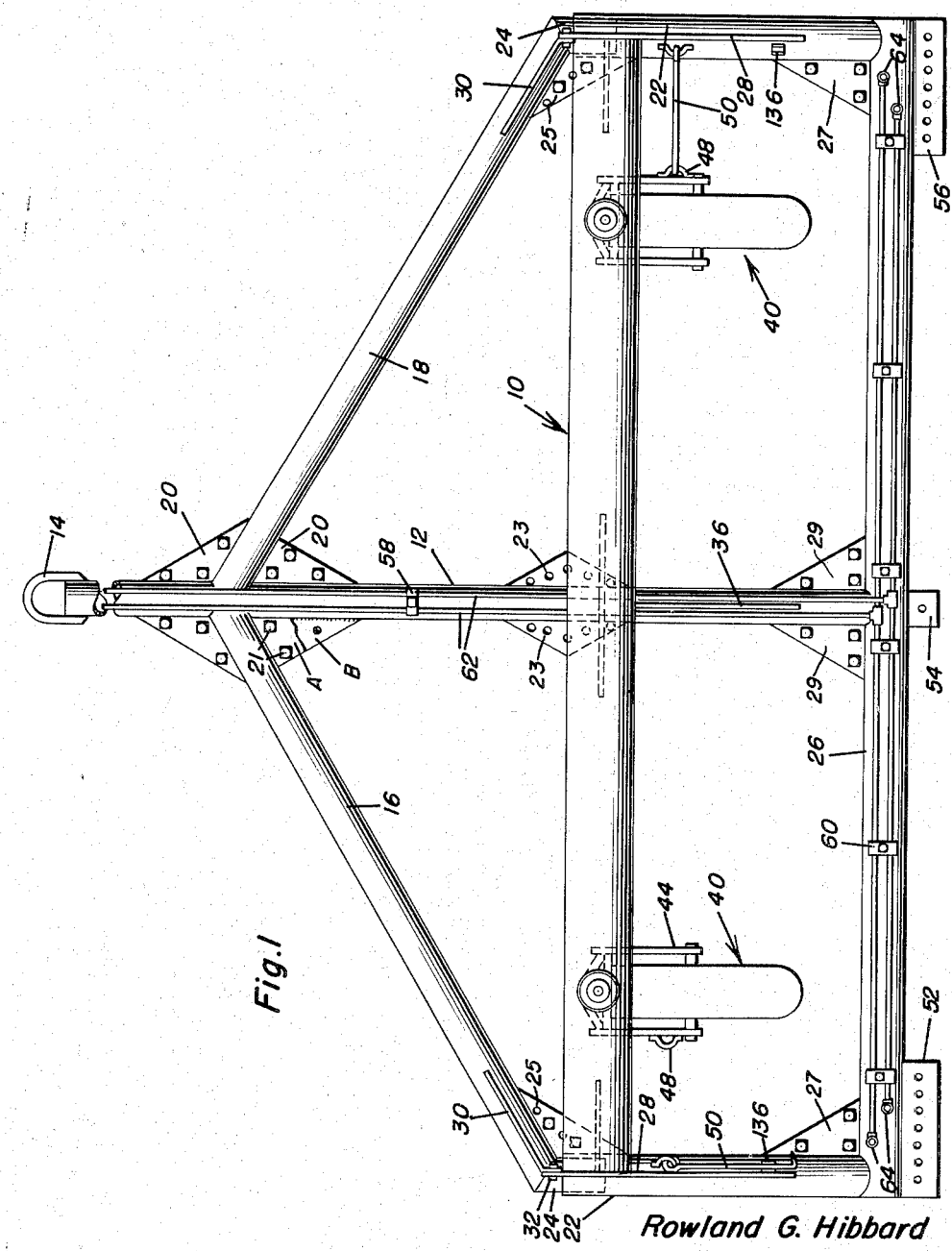

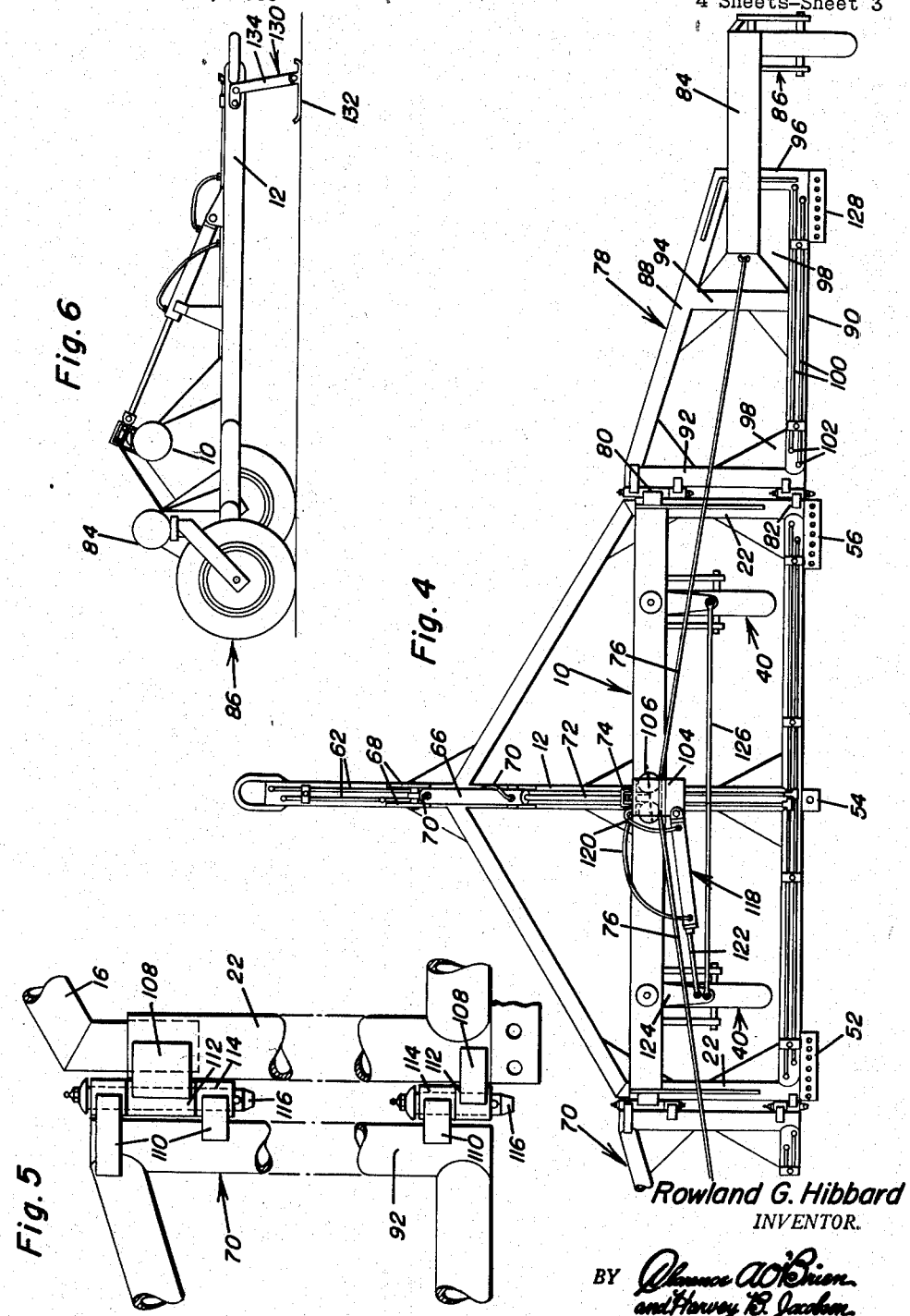

Jan. 27, 1959
R. G. HIBBARD
2,871,028
IMPLEMENT HITCH
Filed Nov. 16, 1953
4 Sheets-Sheet 4
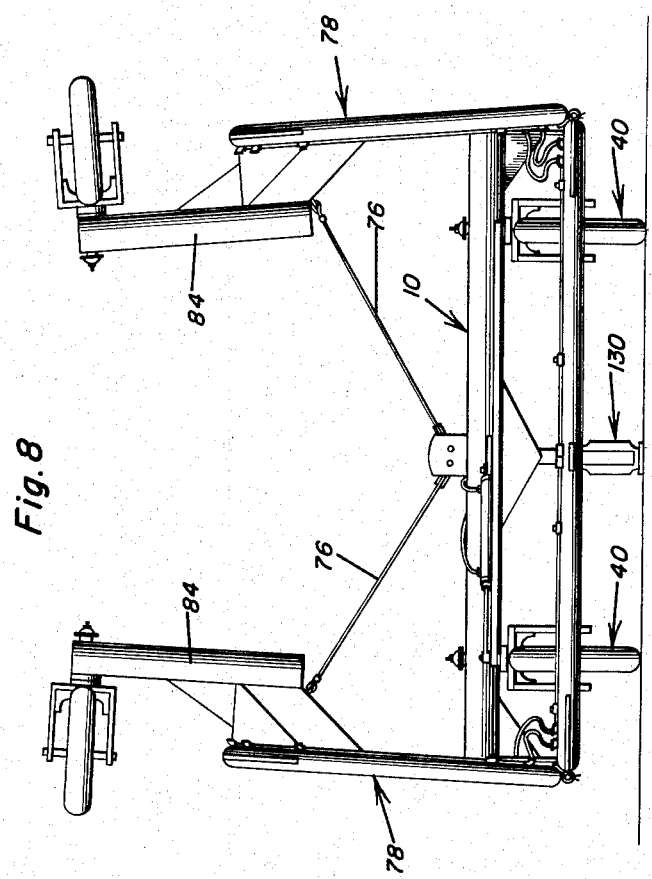
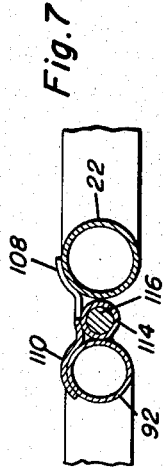
Rowland G. Hibbard
INVENTOR.
BY

United States Patent Office 2,871,028
Patented Jan. 27, 1959

2,871,028

IMPLEMENT HITCH

Rowland G. Hibbard, Billings, Mont., assignor to
J. Frank Dunn, Billings, Mont.

Application November 16, 1953, Serial No. 392,319

14 Claims. (Cl. 280—476)

This invention relates generally to farm implements and pertains more particularly to an improved form of hitching vehicle for use with power vehicles in enlarging the effective drawbar length thereof for particular types of tillage operation such as dragging, harrowing or the like.

A primary object of this invention is to provide an improved form of hitching vehicle which incorporates a main frame including a tubular backbone member which renders the frame section of extremely rugged yet light weight construction.

Another object of this invention is to provide an improved form of hitching vehicle in conformity with the foregoing object wherein the backbone is supported by caster wheels and wherein a tubular frame member is elongated to provide a longitudinal tongue member adapted for connection at its forward end to the drawbar of a powered vehicle, the section also embodying a rearward transverse frame member providing a drawbar.

Another object of this invention is to provide a main frame section in conformity with the foregoing object to which side extension members are pivotally secured, these members being movable under control of the operator between elevated and lowered positions for effectively enlarging the over-all length of the drawbar.

Still another object of this invention is to provide a hitching vehicle of the type described wherein hydraulic control means are provided for steering the caster wheels of the main frame section.

A still further object of this invention is to provide an improved hitching vehicle wherein hydraulic means are provided for raising and lowering each side extension.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the main frame section of the improved hitching vehicle;

Figure 2 is a side elevational view of the assembly shown in Figure 1;

Figure 3 is a rear elevational view of the assembly shown in Figure 1;

Figure 4 is a plan view of the main frame section with side wing extensions attached thereto and incorporating hydraulic mechanism for raising and lowering the wing extensions as well as steering the supporting wheels of the main frame section;

Figure 5 is an enlarged section showing the connection between the main frame section and one of the side wing extensions;

Figure 6 is a side elevational view of the assembly shown in Figure 4;

Figure 7 is a transverse section taken across the pivotal connection shown in Figure 5; and Figure 8 is a rear elevational view of the assembly shown in Figure 4 but showing the side wing extension in elevated position.

Referring now more particularly to the drawings, reference numeral 10 indicates generally the main frame member or backbone of the implement which is preferably of tubular construction and which extends transversely of the vehicle on opposite sides of the longitudinal frame member 12 or tongue whose forward end is provided with a clevis 14 for securement to a power vehicle drawbar. The center section of the hitching vehicle is generally pentagonal in configuration and incorporates the forwardly converging frame members 16 and 18 secured at their forward ends to the frame member 12 and suitably gusseted thereto. To effect a removable securement between the various frame elements, the gusset plates 20 or other gusset plates, as desired, may be provided in overlying pairs, one of which is rigidly secured as by welding to one frame section, the other of each pair being rigidly secured to the adjacent frame element. To effectively illustrate the point, a portion of one of the gusset plates 20 is partially broken away, this particular plate being designated specifically by the letter A and the underlying plate of this pair being designated B. As will be seen, plate A is welded only to frame member 16 whereas plate B is welded only to frame member 12. Each plate is provided with apertures registering with corresponding apertures in the other plate which receive fastening members 21 for removably clamping the plates, and consequently the frame members together. All of the various separate frame members may be similarly connected, or only a portion thereof, such as the gusset plates 23 and 25, the former removably securing separable portions of tongue 12 together and the latter removably securing the forward angular frame members 16 and 18, respectively, to parallel side frame members 22, the purpose being to aid in transporting the assembly. Opposed side frame members 22 receive the rearwardly offset free ends 24 of the members 16 and 18 and the rearward ends of these members 22 are interconnected by the drawbar member 26 in the manner shown, i. e., by gusset plates 27. Side gusset plates 28 are secured on the upper surface of the side frame members 22 and connect at their forward edges to the front gusset plates 30 which are provided on the members 16 and 18, the manner of interconnection between the gusset plate members 28 and 30 being preferably by means of suitable bolts 32, as in Fig. 2. The rear end of longitudinal frame member 12 may be secured to draw bar 26 by gusset plates 29.

As seen most clearly in Figure 3, the backbone 10 is disposed above the plane containing the frame members 16, 18, 22 and 26 and is provided with the depending end plate 34 suitably secured to the previously described side plate 28 and a central depending plate 36 secured to the upper surface of the longitudinal main frame member 12 and suitably gusseted thereto as by the plate members 38. Plate 36 may extend forwardly of the backbone 10, as in Fig. 2, while when gusset plates 23 are made in the form of removably attached pairs, as in Fig. 1, plate 36 may extend only rearwardly from backbone 10 and the lower edge thereof attached only to the rear portion of longitudinal member 12. Or, the front of plate 36 may be removably attached to the front portion of longitudinal member 12, when plate 36 extends forwardly of the backbone 12 and gusset plates 23 comprise detachable pairs.

The caster wheel assemblies are indicated generally by the reference character 40 and are provided adjacent opposite ends of the transverse backbone 10 and include the king pin sleeves 42 projecting vertically therethrough within which the wheel members 44 are pivotally secured, which members rotatably support the wheels 46. Each of the members 44 is provided on the outside thereof with an eye member 48 and a hook 50 carried by the frame members 22 which is selectively engageable therewith. The rear frame member 26 is provided at its rear edge with a series of apertured plate members 52, 54, and 56, these plate members being adapted for connection to various implements to be towed behind the implement hitching vehicle, as will be manifest.

The longitudinal frame member 12 is provided with suitable brackets 58 and the rear frame member 26 is provided with similar brackets 60 for securing the hydraulic fluid line 62 thereto, these lines terminating at opposite sides of the frame section in quick detachable coupling elements 64 for connection to a desired hydraulic control assembly either mounted on the frame section or on a towed implement.

As will be evident, with gusset plates 20, 23, 25, 27 and 29 in pairs with one plate of each pair removably secured to the other plate of the pair, the hitch may be shipped in sections, such as including the angular frame member 16, the angular frame member 18, the backbone 10 with caster wheels 40 and the rear portion of longitudinal frame member 12, the side frame members 22, individually, and the front portion of the longitudinal frame member 12, by disconnecting the gusset plates first mentioned and also disconnecting the side plates 28 from the front plates 30, or also disconnecting the front of plate 36 from the front portion of longitudinal member 12, when plate 36 extends forwardly of backbone 10. If desired, each of the gusset plates 20, 23, 25, 27 and 29 may be solid, as shown in Fig. 4, while the gusset plates 20, 27 and 29 may be solid and the gusset plates 23 and 25 may be removably attached pairs, so that the hitch may be shipped in two sections, i. e., a front section which includes angular members 16 and 18 and the front portion of longitudinal member 12, and a rear section which includes the backbone 12, caster wheels 40, side members 22, draw bar 26 and the rear portion of longitudinal member 12.

Referring now more particularly to Figure 4, it will be seen that the longitudinal frame member 12 is provided with a hydraulic cylinder 66 pivotally secured between bracket ears 68 thereon and this cylinder may be suitably connected as through line 70 to the previously described line 62, one of which is an inlet and the other of which is a return. The hydraulic cylinder assembly includes a piston rod member 72 extending from the rearward end of the cylinder 66 and carrying a fastening member 74 to which the free ends of cable members 76 are secured.

Side wing extension members indicated generally by the reference character 78 are pivotally secured as by the hinge mechanism 80 and 82 to the side frame members 22 and the laterally extending frame members 84 thereof are disposed at the same height as the previously described frame members 10, the free ends of these members 84 supporting the caster wheel assemblies 86.

The wing extensions include the front and rear frame members 88 and 90 and the various longitudinal members 92, 94 and 96, all of the frame members being suitably gusseted together as by the plate members 98. The frame member 90 or auxiliary draw bar of the extension may be provided with the hydraulic line 100 terminating in the quick detachable connections 102 so as to extend the previously described line 62.

A pulley mounting bracket 104 is suitably secured to the frame member 10 of the main section and carries the pulley members 106 acting as guides for the previously described cable members 76 as they extend laterally therefrom to their point of connection on the frame members 84 of the wing extension. In this respect, it will be noted that the frame members 84, being on the same common plane as the main frame section 10, will effect a slight moment arm when the cables 76 are tensioned so that the extensions 78 will freely swing about their pivot means 80 and 82.

Referring now more particularly to Figure 5, it will be seen that the pivot mechanisms 80 and 82 include the strap members 108 and 110 secured to the frame members 22 and 92 respectively and which carry the pintle sleeves 112 and 114 respectively through which the pivot pins 116 extend in the manner shown.

Referring now more particularly to Figure 4, it will be seen that a hydraulic piston and cylinder assembly 118 may be pivotally secured to an extension of the pulley bracket 104 and which may be connected to suitable lines 120 to the previously described lines 62 and have suitable control means associated therewith under control of the operator of the powered vehicle towing the implement hitching vehicle so as to selectively extend or withdraw the piston rod 120 to which is, in turn, pivotally secured at its free end to a pitman arm 124 associated with the caster wheel assemblies 140, both caster wheels being interconnected by means of the tie rod 126. In this manner, the implement hitching assembly may be readily operator controlled during difficult maneuvering operations such as on hillsides or the like.

The wing extensions are provided with drawbar plate members 128 and it will be obvious that the main section taken in conjunction with the side wing extensions permit an extremely long effective drawbar construction for harrowing, dragging, or the like.

As seen most clearly in Figure 6, the forward end of the frame member 12 may be provided with a skid assembly 130 including the runner member 132 and hingedly depending strut member 134 for supporting the implement when it is detached from an associated tractor or other powered vehicle. Of course, suitable mechanism is provided for holding the skid assembly in upwardly folded position during normal use of the implement.

In Figure 8, the elevated position of the side wing extension assemblies 78 is shown which is effected by fully retracting the piston rod 72 and thereby pivoting the side wing extensions to the position shown, wherein they abut the opposite ends of the main frame section 10.

In both of the assemblies as shown in Figures 1 and 4, it will be manifest that the caster wheels 40 may be locked in a straight-ahead position either through the hydraulic means shown in Figure 4 or by means of the hook members 50 as shown in Figure 1, this position of the caster wheels being particularly useful in difficult maneuvering operations of the assembly such as backing or the like. When it is desired to position the hook members 50 in an out-of-the-way position, they may be associated with the spring clips 136 provided on the side frame members 22.

It will be obvious that the above described construction effects a maximum of rigidity with a minimum of weight inasmuch as the assembly utilizes tubular construction throughout its extent and is particularly adapted and designed to transmit the load imposed thereon evenly to its component frame member. In this respect, it will be noted that the drawbar pull effected through the member 12 is taken in part by the frame members 16 and 18 and transmitted thereto to the main frame section 10 and thence evenly to the drawbar rear frame member 26.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An implement hitch comprising a substantially horizontal, longitudinal frame member provided at its forward end with means for attachment to a tractor drawbar and the like; a pair of substantially horizontal angular frame members extending respectively angularly to each side from a forward position on and connected to said longitudinal member; a pair of side frame members connected to and extending rearwardly from the respective rear ends of said angular members; a draw bar extending transversely and connected to said side members adjacent the rear ends thereof and also connected centrally to said longitudinal member adjacent the rear end thereof, said longitudinal member, angular members, side members and draw bar lying substantially in the same substantially horizontal plane; a transverse backbone disposed above said plane and provided with depending caster wheels in positions at each side of said backbone and closer to said side members than to said longitudinal member, said backbone being the main frame member and adapted to support the vertical load of said longitudinal member, side members, angular members and draw bar; means extending between said backbone and said longitudinal member for supporting the latter from said backbone; and means extending between each said side member and said backbone adjacent the respective ends of the latter for supporting said side members from said backbone.

2. An implement hitch as defined in claim 1, wherein said means connecting said backbone and said side members comprises a pair of vertically disposed plates, each longer at the bottom than at the top and each attached along its bottom to a side frame member and attached at the top to the end of said backbone.

3. An implement hitch as defined in claim 2, wherein said backbone is tubular and each said vertically extending plate closes one end of said tubular backbone.

4. An implement hitch as defined in claim 2, including a pair of vertically extending plates, each having its bottom attached to one of said angular members adjacent the rear end of the latter and at its rear edge attached to the vertical plate which is attached to said side frame member and backbone.

5. An implement hitch as defined in claim 4, wherein said rear vertical plates attached to said side frame members are welded to the top thereof and said front vertical plates attached to said angular frame members are welded to the top thereof; and wherein one of each of said front and rear vertical plates at each side is provided with an angular flange for removable attachment to the other of said plates.

6. An implement hitch, as defined in claim 5, wherein each said angular frame member is connected to the corresponding frame member by a pair of gusset plates removably attached together, one of said pair of gusset plates being welded to the inside of said angular member and the other of said gusset plates being welded to the inside of said side frame member.

7. An implement hitch as defined in claim 1, wherein said longitudinal frame member is separable into front and rear portions attached together by a pair of gusset plates on each side, with one gusset plate of each pair being welded to said front portion and the other plate welded to said rear portion.

8. An implement hitch, as defined in claim 1, wherein said means connecting said backbone and said longitudinal frame member comprises a generally vertical, longitudinally disposed plate, longer at the bottom than at the top and attached at its bottom to said longitudinal member and at its top to said backbone; and a transverse gusset plate at each side of said longitudinal plate and welded along its upper edge to the underside of said backbone and along its inside edge to said longitudinal plate.

9. An implement hitch as defined in claim 1, including an extension wing at each side pivoted at its inner edge on one of said side frame members and provided along its rear with a normally horizontal, transversely extending, auxiliary draw bar; and means mounted on said backbone for selectively lifting each said wing to an upper position.

10. An implement hitch, as defined in claim 9, wherein each said wing is provided with a lateral member extending outwardly beyond said auxiliary draw bar and disposed forwardly and above said auxiliary draw bar normally at approximately the level of said backbone; and an auxiliary caster wheel depends from said lateral member adjacent the outer end thereof.

11. An implement hitch, as defined in claim 10, wherein each said wing includes an inner longitudinal member pivotally attached to said side frame member; an outer longitudinal member disposed beneath said lateral member and shorter than said inner member; a front angular member extending between the front ends of said inner and outer longitudinal members; an intermediate longitudinal member extending between said front angular member and said auxiliary draw bar; gusset plates reinforcing the connection between inner member and front angular member and draw bar, respectively, and the connection between said intermediate longitudinal member and said front angular member and draw bar, respectively; and gusset plates connecting said lateral member with said outer longitudinal member, said front angular member and said draw bar, respectively.

12. An implement hitch, as defined in claim 10, wherein said wing lifting means is hydraulically operated and connected by a cable to the inner end of the lateral member of each wing; and including additional hydraulic means mounted on said backbone for controlling said backbone caster wheels in unison.

13. An implement hitch comprising a framework lying substantially in a horizontal plane and provided at its front with means for attaching a tractor or the like thereto and having side members and at the rear a transversely extending draw bar to which a plurality of implements may be attached, said framework being formed to provide a space inwardly from each side member; a backbone extending transversely at an elevation above said plane and above said spaces said backbone being the main frame member and adapted to support the vertical load of said framework; a caster wheel depending from said backbone in each said space; and means connecting the ends of said backbone with the side members of said framework to support the latter from said backbone.

14. An implement hitch, as defined in claim 13, wherein said framework includes a central longitudinal member extending from said attaching means at the front to said draw bar at the rear; and said hitch includes means connecting the center of said backbone with said longitudinal member.

References Cited in the file of this patent

UNITED STATES PATENTS

| | | |
|---|---|---|
| 829,766 | Chase | Aug. 28, 1906 |
| 1,154,763 | Gunderson | Sept. 28, 1915 |
| 1,878,346 | Swanson | Sept. 20, 1932 |
| 2,496,474 | Hyman | Feb. 7, 1950 |
| 2,599,084 | Archer et al. | June 3, 1952 |
| 2,646,850 | Brown | July 28, 1953 |
| 2,750,724 | Stephenson | June 19, 1956 |